J. B. WISHART.
SPONGE RUBBER ARTICLE AND METHOD OF MAKING THE SAME.
APPLICATION FILED AUG. 5, 1919.
1,345,904. Patented July 6, 1920.
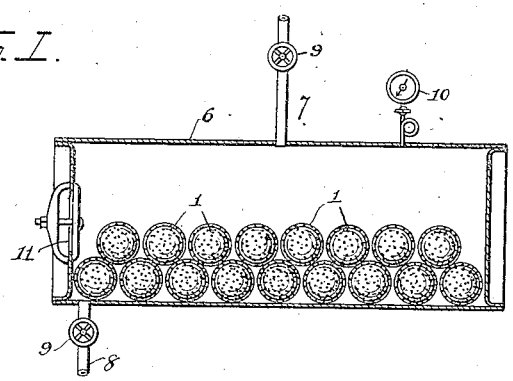
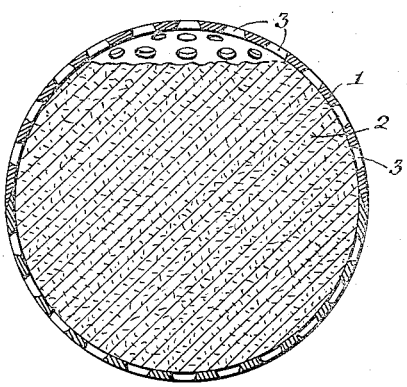
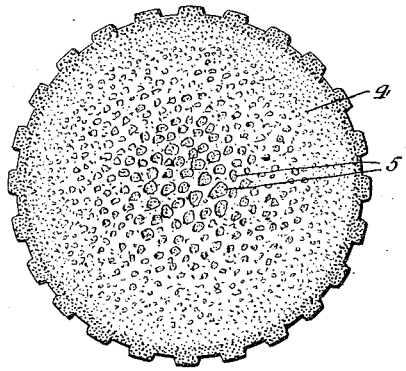
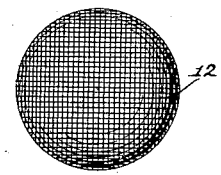
WITNESSES
H. J. Walker
S. W. Foster
INVENTOR
J. B. Wishart
BY Munn & Co.
ATTORNEYS

UNITED STATES PATENT OFFICE.

JAMES BENJAMIN WISHART, OF TRENTON, NEW JERSEY.

SPONGE-RUBBER ARTICLE AND METHOD OF MAKING THE SAME.

1,345,904.  Specification of Letters Patent.  Patented July 6, 1920.

Application filed August 5, 1919. Serial No. 315,468.

*To all whom it may concern:*

Be it known that I, JAMES B. WISHART, a citizen of the United States, and a resident of Trenton, in the county of Mercer and State of New Jersey, have invented a new and Improved Sponge-Rubber Article and Method of Making the Same, of which the following is a full, clear, and exact description.

This invention relates to improvements in sponge rubber articles and method of making the same, an object of the invention being to provide an improved sponge rubber ball or other article of great resiliency. A further object is to provide an improved method of making sponge rubber articles which results in an article having in its central portion relatively large cells or interstices, the cells or interstices decreasing in size toward the exterior of the article and at the exterior of the article the cells being minute so that the surface is practically a smooth continuous one permitting of necessary wear, while the relatively large cells give to the article an unusual resiliency which is especially advantageous in balls and similar articles which are used for bounding or bouncing purposes.

With these and other objects in view the invention consists in certain novel steps in the method as will be more fully hereinafter described and pointed out in claims.

In the accompanying drawings,

Figure 1 is a view in longitudinal section and through a vulcanizer illustrating one step of my improved method.

Fig. 2 is a large view in section through a mold with the composition therein before the vulcanizing step of the process is carried out.

Fig. 3 is a view in section through the finished ball; and

Fig. 4 is a perspective view illustrating a modification.

In carrying out my improved method I first prepare the necessary composition to produce the sponge rubber. While, of course, various modifications might be resorted to with respect to the formula I have found the following to give good results.

Smoked sheet rubber ..... 70 parts
Sulfur .................. 6 parts
Ammonium carbonate ...... 8 parts
Zinc oxid ............... 12 parts
Magnesium oxid .......... 4 parts
                         _____
                         100 parts These ingredients are mixed together in any suitable manner to form a composition which is composed within a suitable mold 1, the mold being made in any number of sections and secured together in any approved manner. The composition indicated by the reference numeral 2 does not entirely fill the mold as shown in Fig. 2 because, during the vulcanizing step of the process the composition will expand completely filling the mold.

The mold is made with perforations 3 which may, of course, be of any desired shape and the composition during the vulcanizing step of the method will swell out into the perforation so that the surface of the ball indicated by the reference numeral 4 will have a design and contour conforming to the mold. Gases formed in the outer portion of the composition will escape through the perforations.

The second step of the method is to locate the molds with the composition therein in a suitable vulcanizer 6, the latter having steam circulating pipes 7 and 8 controlled by valves 9. The gage 10 is located on the vulcanizer to indicate the pressure and temperature or both, and a suitable inlet 11 is provided in the vulcanizer for the admission and removal of the molds.

During the vulcanizing step of the method gas is formed in the composition which results in the formation of cells within the composition and these cells indicated by the reference numeral 5 are largest at the center of the composition and gradually decrease in size to the outer surface thereof where the cells are extremely small, and in fact almost disappear so that the outer surface of the article thus made is smooth and capable of considerable wear. After the vulcanizing step of the method is complete the molds are removed and the sponge rubber articles thus made are removed from the mold and as soon as they become cool enough are ready for use. In the modification illustrated in Fig. 4 the ball 12 is made with a surface which would be formed if the mold were of wire mesh, and as above stated any design of surface can be provided in accordance with the mold employed.

By providing a perforated mold and partially filling the mold with the composition as above stated, and then vulcanizing the mass in a receptacle, gas is formed in the composition which results in the formation of cells. The gas in the cells adjacent the outer edges of the composition more readily escapes than the gas at the central portion of the composition so that as a result the cells are largest at the center and gradually reduce toward the edges. This, as above stated, is due to the fact of the perforated mold which allows the gas at the outer portion of the composition to escape more readily than at the inner portion, and the result is as above defined.

I claim:

1. A sponge rubber article having cells therein, the cells being largest at the central portion of the article and decreasing in size toward the surface of the article.

2. As a new article of manufacture, a sponge rubber ball having cells therein, the cells being largest at the center of the ball and decreasing in size toward the surface of the ball.

3. The herein described method of making sponge rubber articles consisting in first locating the composition within a perforated mold, the composition but partially filling the mold, then vulcanizing the composition in the mold causing the composition to swell or expand and fill the mold, and creating within the composition a large number of cells, the cells being largest at the center of the composition and decreasing in size to the edges thereof.

4. The herein described method of making sponge rubber balls consisting in the provision of a mold having perforations therein, locating within the mold a sponge rubber composition, the composition but partially filling the mold, then locating the mold in a vulcanizing receptacle and submitting the composition to the action of steam for a predetermined period to generate gas within the composition and form cells therein, the cells being formed largest at the center of the composition and decreasing in size toward the exterior of the composition, said composition expanding during the vulcanizing step of the process so that it projects into the perforation of the mold and performs a design on the ball conforming to the mold.

5. The herein described method of making sponge rubber articles consisting first in the formation of a composition of smoked sheet rubber, sulfur, ammonium carbonate, zinc oxid and magnesium oxid in substantially the proportions stated, then locating said composition in a perforated mold partially filling the mold, and then vulcanizing the composition in the mold.

JAMES BENJAMIN WISHART.